United States Patent [19]

Mongeon

[11] 4,340,299
[45] Jul. 20, 1982

[54] OPTICAL DOPPLER RADAR SYSTEM USING A CONICALLY SCANNED LASER BEAM

[75] Inventor: Robert J. Mongeon, Longmeadow, Mass.

[73] Assignee: United Technologies Corporation, Hartford, Conn.

[21] Appl. No.: 129,947

[22] Filed: Mar. 13, 1980

[51] Int. Cl.³ .......................... G01P 3/36; G01C 3/08
[52] U.S. Cl. ........................................ 356/28.5; 356/4
[58] Field of Search .................... 356/1, 4, 5, 28.5; 358/95, 96, 109; 343/5 CM

[56] References Cited

U.S. PATENT DOCUMENTS

| | | | |
|---|---|---|---|
| 3,134,902 | 5/1964 | Chase et al. | 358/109 |
| 3,527,533 | 9/1970 | Hook et al. | 356/5 |
| 3,565,528 | 2/1971 | Witte | 356/5 |
| 3,984,685 | 10/1976 | Fletcher et al. | 356/28.5 |
| 4,143,400 | 3/1979 | Heckman, Jr. et al. | 358/95 |
| 4,167,329 | 9/1979 | Jelalian et al. | 356/28.5 |
| 4,236,819 | 12/1980 | Green | 356/5 |

OTHER PUBLICATIONS

R. L. Del Boca et al., Agard Conference Proc. #258, Oct. 1978.

*Primary Examiner*—S. C. Buczinski
*Attorney, Agent, or Firm*—Robert E. Greenstien

[57] ABSTRACT

A homodyne laser of a first frequency is conically scanned on a surface from an elevated position and the beam is scattered by the surface. A return beam is formed from this scattered beam and is mixed with a single side band suppressed carrier laser beam at an offset frequency, producing an electrical signal whose frequency shifts from the offset frequency in proportion to the velocity relative to the surface. That shift is a function of the scan position and the direction of movement. Velocity components of the signal reflecting drift velocity and heading velocity are resolved from this signal by referencing it to the scan position at drift and heading positions. The signal component reflecting elevation velocity is resolved by removing those scan dependent components.

3 Claims, 4 Drawing Figures

OPTICAL DOPPLER RADAR SYSTEM USING A CONICALLY SCANNED LASER BEAM

The Government has rights in this invention pursuant to Contract No. DAAB07-76-C-0920 awarded by the United States Army.

TECHNICAL FIELD

This invention relates to systems sensing movement relative to a surface from a moving position. Such systems are particularly useful as airborne navigation systems for helicopters and other aircraft.

BACKGROUND ART

State of the art airborne navigation systems continue to emphasize the use of microwave Doppler radar techniques; basically, a microwave signal is transmitted from a moving platform to a reference surface in order to detect such movement by then sensing the frequency shift such movement produces in the radiation transmitted to and reflected from the surface. This shift ($\Delta F$) is due to the Doppler effect and is proportional to the relative velocity between the transmitter and the surface, modified by the transmission angle. It is defined by the Doppler equation:

$$\Delta F = 2V/\lambda \cos \phi_s \qquad (1)$$

where V is the velocity vector relative to the surface and $\phi_s$ represents the angle between the velocity vector and the instantaneous radar transmission angle, independent of the radiation's angle of incidence at the surface.

These systems can be used to derive the three dimensional velocity vector from the sensed movement: heading ($V_H$); drift ($V_D$) and altitude ($V_E$). The heading and drift vectors are coplanar and perpendicular, in quadrature with each other; the altitude vector is perpendicular to the plane.

These systems typically use three or more separate microwave antennas and receivers to resolve the velocity vector. The system output is spatially multiplexed in angle by the fixed antenna spray so as to resolve the velocity vector. For example, two microwave antennas used for sensing the heading and drift movement would be arranged in quadrature pointing towards their respective directions. Additional parameters can be resolved from the obtained velocity: such as, acceleration (by differentiation) and displacement (by integration).

These systems have several significant disadvantages. Using microwave frequencies the best possible resolution is typically no better than 20–30 cm/sec; this is due, in part, to the large defraction angle at microwave frequencies. At these wavelengths the return characteristics (noise, for example) of the signal are highly dependent on the surface characteristics, which can cause dramatic changes in the return signal. In addition, there is significant radial defraction spread at these frequencies which facilitate the detection of system operation; this lack of covertness may limit the utility in hostile areas.

An optical system, one using a laser, has distinct advantages in the above respects and is therefore an attractive alternative. Its much shorter wavelength can provide superior resolution and the signal return is less dependent on surface characteristics. The laser beam may be very narrow and has minimal defraction spread; it is therefore not easily detected. However, it is expensive and complicated to use multiple lasers, antennas and detectors, and so, even though a more precise navigation system, one overcoming the pitfalls of a microwave radar system, may find solution in the laser technology, that technology has not clearly presented an attractive way for sensing three dimensional movement in an economical, practical way. The fact is that for laser technology to be useful in these systems there is a need for an arrangement by which a laser Doppler shift can be ascertained, in the required three dimensions, by using only one laser beam, for such a system can be small, light and cost attractive.

In the paper I coauthored with R. L. Delboca, *The Guidance and Control of Helicopters and V/STOL Aircraft at Night and in Poor Visibility*, (October 1978), reprinted from the Conference Proceedings No. 258 of the Advisory Group for Aerospace Research and Development of the North Atlantic Treaty Organization, my Doppler homodyne laser scanning system is conceptually described. A $CO_2$ laser produces a beam that is then conically scanned on the surface by means of an aperture shared germanium wedged prism. The laser beam that is scattered from the surface is received by the same scanner and is mixed with an offset laser beam. Through a subsequent process of FM discrimination and phase sensitive detection the various Cartesian coordinate vectors may be resolved.

DISCLOSURE OF INVENTION

The present invention focuses on providing a system by which those velocity components may be resolved from the laser beam scattered from the reference surface.

The present invention is premised on certain unique characteristics of a single homodyne optical Doppler scanning system of this type. As the laser is scanned conically, the frequency shift at diametrically opposite positions along the scan are equal and opposite. Thus, the frequency shift is sinusoidal and the peak shifts coincide with a diametric line on the scan path representing the resultant or effective velocity relative to the surface. The average shift, however, is unaffected by the scan position and reflects elevational velocity.

As drift and forward velocities relative to the surface change, they produce not only changes in these peaks, but also in the phase relationship of the shift to the scan position, because changes in those velocities result in changing the resultant direction of movement and, thus, in changing the position of that resultant velocity vector, whose Cartesian (quadrature vector) components are drift and forward velocities.

According to the invention, the drift and forward velocities are resolved through a comparison process that compares the phase of the frequency shift ($\Delta F$) with the phase of the two quadrature vector components that define the instantaneous position of the laser scan. This resolves the frequency shift into two corresponding quadrature vector components that define its instantaneous magnitude. The magnitude of each of these components is varied in relation to the absolute magnitude of the frequency shift and the phase difference between each of these two scan vectors and the frequency shift. To determine the elevational velocity the average frequency shift is resolved by removing the alternating component of the frequency shift.

BEST MODE FOR CARRYING OUT THE INVENTION

Figure 1:
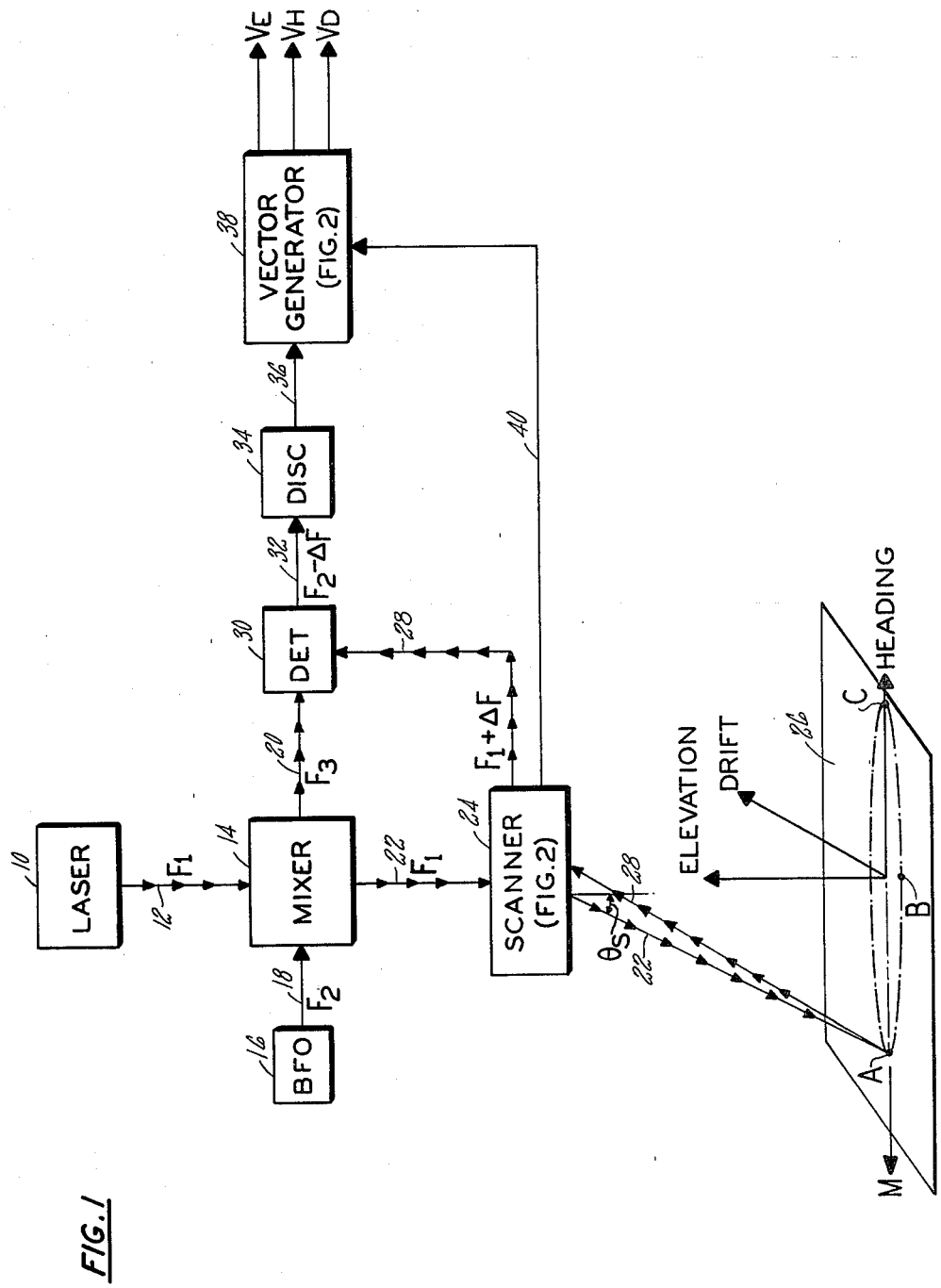
FIG. 1 is a functional block diagram of a laser optical Doppler radar system using conical scanning for resolving the three Cartesian velocity vectors reflecting drift—side motion, heading—forward motion and altitude—elevational movement.
Figure 3:
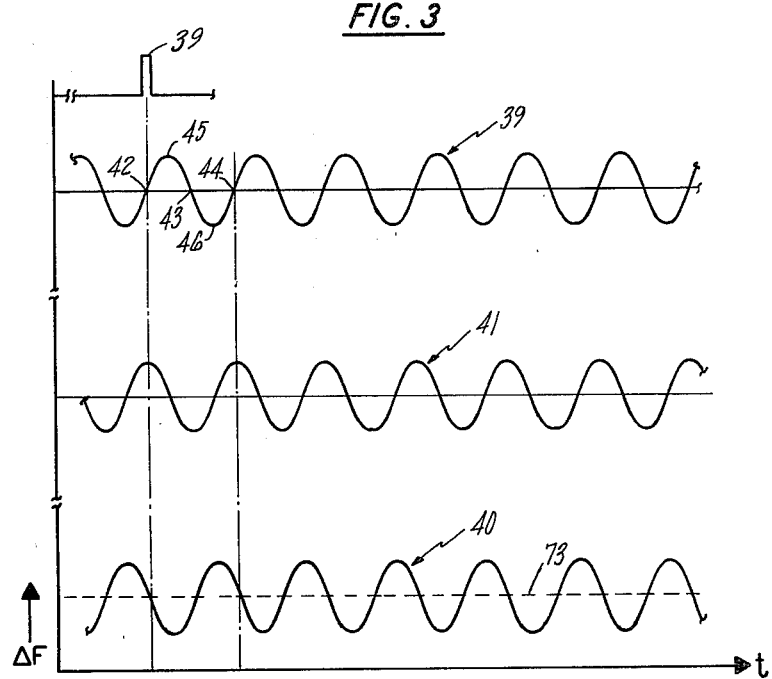
FIG. 3 is a graph containing three waveforms on a common time base; one waveform is a plot of the scan position; a second waveform is that plot with a 90° phase shift; a third waveform shows the frequency shift associated with the scattered laser beam from the surface obtained during the scan.

The system shown in FIG. 1 uses a single laser source 10. This source produces a homodyne carrier wave (CW) single frequency laser beam 12 at a frequency $F_1$ and wavelength $\lambda$, and this beam is supplied to an acousto optical mixer ("Bragg Cell") 14. A beat frequency oscillator (BFO) 16 produces an electrical signal (BFO signal) which is supplied over a line 18 to one input to the mixer 14. The BFO signal is at a frequency $F_2$. The mixer produces a single side band suppressed carrier laser beam 20 at an offset frequency $F_3$, and $F_3 = F_1 + F_2$. The mixer also retransmits the beam 12. The beams 12, 20 are on different optical axes in the mixer. The laser beam 12 is directed to a scanner system 24 and the scanner system directs the beam 12 onto a surface 26 at an angle $\phi_S$. The beam is repetitively, conically scanned, at a repetition rate $F_4$, on the surface, passing through reference scan points A, B, C and D. The laser beam scatters off the surface, producing a "return" beam 28 which is imaged by the scanner 24; the return beam frequency is $F_5$. The scanner (further described later) is designed to separate the two beams 22 and 28, and from the scanner the return beam 28 is directed to an optical detector 30. The detector receives the laser beam 20 and the return beam 28, aligned so as to efficiently heterodyne, and from these two beams 20, 28 the detector outputs an electrical signal (DET signal) which is supplied to the input of a frequency discriminator 34. The frequency ($F_6$) of the DET signal is the difference between the frequency ($F_3$) of the laser beam 20 and the frequency of the return beam 28 ($F_6 = F_1 + F_2 - F_1 + \Delta F$ or $F_2 - \Delta F$); in other words, the frequency $F_6$ is the BFO frequency displaced by a $\Delta F$ shift. $\Delta F$ is determined according to the Doppler equation (1), and it arises from the heading, drift and elevation velocity components at the different scan positions. The DET signal is supplied on a line 32 to the frequency discriminator 34, where null frequency is $F_2$, and the discriminator outputs an electrical signal 36 (DISC signal). The magnitude of the DISC signal reflects $\Delta F$ and its average level 43, the portion which is not frequency dependent, reflects $\Delta F$ arising from elevational velocity. The DISC signal is supplied on a line 36 to a vector generator 38, which produces three output signals (or indicia): one reflects elevation velocity ($V_E$); a second reflects drift (transverse) velocity ($V_T$); and the third reflects heading (longitudinal or forward) velocity ($V_H$). The vector generator does this by comparing the DISC signal and the scan position. The vector generator receives, over a line 40, from the scanner, a first scan position signal (i.e. trigger pulse) that identifies the position of the scan with respect to a particular scan point or position, for instance, point A. From that pulse, the vector generator produces a scan position signal 39 (SP signal), which is shown in FIG. 3. The SP signal is generated synchronously with the scan and at the scan repetition rate. One complete scan is shown by the time window TW; this reflects the movement of the scan from position A, for example, at the reference point 42 to position C (at 43) and then returning to A once again. The points C and D, which are in quadrature (90°) with points A and B, are identified at reference points 45 and 46, respectively, in the SP signal 39; there they are also in quadrature. The vector generator also produces a quadrature phase scan position signal 45 (QSP signal); this signal is 90° out of phase with respect to the SP signal. It should be apparent that the QSP and SP signals thus reflect the scan position relative to two quadrature points (i.e. A and B).

Figure 4:
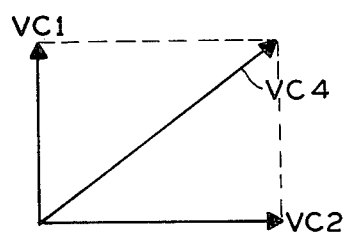
FIG. 4 is a vector or diagram of the frequency shift waveform that is shown In FIG. 3.

FIG. 4 shows a vector diagram of the DISC signal which consists of two quadrature vector components VC1 and VC2, which, in combination, define the vector magnitude and orientation of the DISC signal vector VC4. In the vector generator the phase of the time varying DISC signal is compared with the SP signal and the QSP signal and the comparison with each is used to vary the magnitude of corresponding signals. But since the SP and QSP signals are in quadrature with each other, the comparison resolves the DISC signal into those two vectors (VC1, VC2); and since the SP and QSP signals represent heading and drift readings, the DISC signal is thus resolved into its components in those directions. In other words, the vectors correspond with different heading and drift directions. The vector generator also varies the magnitude of each vector in proportion to the magnitude of $\Delta F$. Consider this example, which demonstrates this vector resolution procedure: In FIG. 1 assume there is only heading velocity ($V_H$), movement in the direction of arrow M; this will produce a particular phase shift or $\Delta F$ (See equation (1)) which will have its absolute maximum at positions A and C (where there is $\pm V$); thus, the DISC signal will be in phase with the SP signal, yet 90° out of phase with the QSP signal, because at scan positions B and D the Doppler shift is zero because there is no relative velocity at these points. Hence, the magnitude of the time varying DISC signal reflects the velocity and the phase difference with respect to the SP and QSP signals that identify the direction. Since there is relative motion during both transmission and reflection (scattering), $\Delta F$ is twice the shift in one direction. The DISC signal, $\Delta F$, reflects the vector summation; $\Delta F$ = heading induced shift ($\Delta FH$) + drift induced shift ($\Delta FD$) + elevation induced shift ($\Delta FE$). $\Delta FH$ and $\Delta FD$ are defined by these equations:

$$\Delta FH = (2V_H/\lambda) \sin \phi_s \sin (2\pi Wt), \quad (2)$$

where $V_H$ = heading velocity; $W$ = scan frequency.

$$\Delta FD = (2V_D/\lambda) \sin \phi_s \sin (2\pi Wt + \pi/2) \quad (3)$$

where $V_D$ = drift velocity.

On the other hand $\Delta FE$ is independent of the scan rate and so:

$$\Delta FE = (2V_E/\lambda) \cos \phi_s \quad (4)$$

where $V_E$ = elevation velocity.

Figure 2:
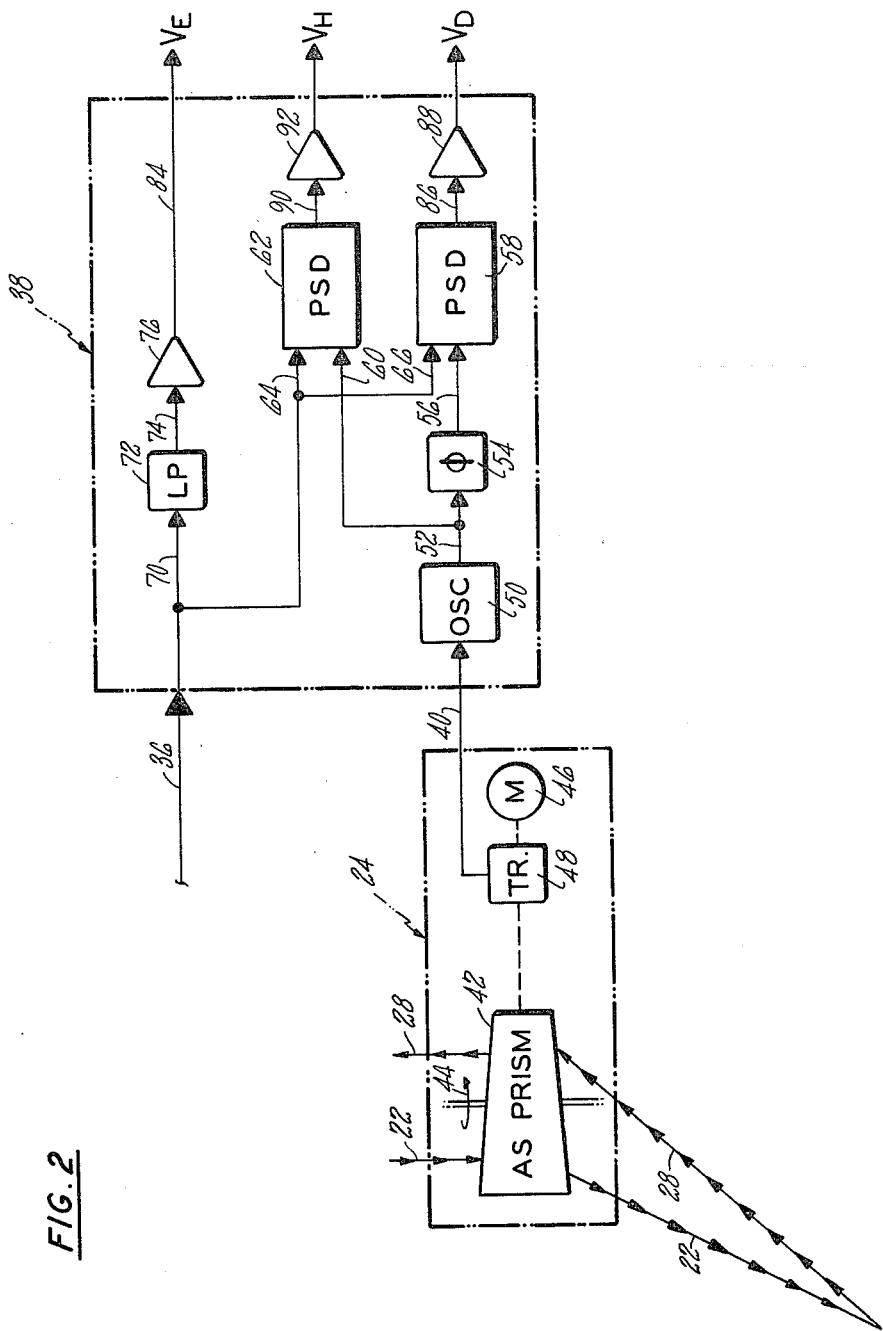
FIG. 2 is a functional block diagram of a scanner and a vector generator in a system shown in FIG. 1.

FIG. 2 shows the scanner 24 and the vector generator 38 in further detail. The scanner 24 includes an "aperture shared" prism which is rotated in the direction of arrow 44; this being axially (perpendicular) with respect to the surface. An aperture shared prism is used so that the beam 28 is optically separated from the return beam 28. The prism 42 is rotated by a motor 46 at the repetition rate $F_4$. The prism position is sensed by means of a transducer 48 coupled to it and the transducer produces a pulse 39 (triggering signal) in synchronism with the scan rotation. This pulse is supplied over the line 40 to the vector generator 38. The vector generator contains an oscillator 50 which receives the pulse which triggers the oscillator to produce the SP signal shown in FIG. 3. The SP signal is supplied over a line 52 to a quadrature phase shift circuit 54 and the quadrature phase shift circuit outputs the QSP signal over line 56 by shifting the phase of the SP signal 90°. The QSP signal is supplied to a phase sensitive detector 56 for generating the $V_D$ indicia. This, and a second, later mentioned phase sensitive detector, are available from Princeton Applied Research, which identifies them as PAR 120 phase sensitive detectors. They generate a signal whose amplitude is varied in proportion to the phase shift and the magnitude of the frequency, W. The SP signal from the oscillator 50 is supplied over a line 60 to the second phase sensitive detector 62 for generating the $V_H$ indicia. The DISC signal on the line 36 is supplied over a line 64 to a second input of the phase sensitive detector 62 and over a line 66 to a second input of the phase sensitive detector 58. The DISC signal is also supplied over a line 70 to the input of a low pass filter 72 and the output of the low pass filter is supplied over the line 74 to a buffer amplifier 76 for outputting the $V_E$ indicia. The low pass filter 72 removes the undulating portions of the DISC signal, thus leaving the average DC level of the signal. This DC signal appears on the line 74 and is supplied to the input of the amplifier 76 which produces a DC output, on its output line 84. That DC output is proportional to the average $\Delta F$ and, hence, reflects $V_E$. The phase sensitive detector 58 responds to the time varying DISC signal, W, and the QSP signal to produce a signal which is supplied over a line 86 to a buffer amplifier 88 that produces an output reflecting $V_D$. The phase sensitive detector responds to the difference in the phase between the QSP and the absolute magnitude of the time varying DISC signal to produce an output whose magnitude is varied from a maximum, for a zero degree phase shift to zero for a 90° phase shift. The other phase sensitive detector 62 receives the DISC signal and produces over its output line 90 a signal which is supplied to a buffer amplifier 92 that produces an output manifesting the $V_H$. That phase sensitive detector is also responsive to the magnitude of the SIG signal and the phase difference between it and the SP signal and it varies its output, on the line 90, from a maximum to zero in proportion to the phase difference between the DISC and SP signals. As with both phase sensitive detectors the maximum level they can produce on their respective output lines (the maximum signal they produce), is proportional to the absolute magnitude of the time varying DISC signal, and, as stated previously, that absolute maximum represents the absolute maximum phase shift $\Delta F$, which occurs in the actual direction of movement.

The following components and parameters have been flown in a prototype system which was capable of resolving velocities within 1-2 cm/sec above 10 m elevation:

| | |
|---|---|
| Laser 10: | 1 watt |
| | $\lambda$ = 10.6 microns |
| BFO Frequency $F_2$: | 86 MHz |
| AS Prism 42: | Germanium, 3 inch diameter |
| | 7 mm Transmit and Receive Aperture |
| | 1.5 cm Axis Separation |
| Scan Rate: | 100 Revolutions/second |

Other modifications, variations and alterations, in and to the described embodiment of the invention, will be obvious to one skilled in the art and, therefore, may be made without departing from the true scope and spirit of the invention embodied therein.

I claim:

1. A method for generating indicia of movement relative to a surface at a position above the surface comprising the steps:

scanning a first laser beam and synchronously receiving, during the scan, the first laser beam scattered from the surface to produce a return laser beam, generating a frequency difference electrical signal from the frequency difference between the return laser beam and the first laser beam after mixing it with a reference frequency, generating movement signals that indicate electrical movement and horizontal movement in selected horizontal directions by splitting said frequency difference signal into its components that vary in proportion to movement in selected directions and that component which varies independently of the position of the scan, characterized by:

generating a scan position signal indicative of of the position of the scan from a reference position, comparing the phase of said scan position signal with the phases of said frequency difference signals at quadrature phase angles the correspond to the quadrature angular positions of the scan to produce indicia of horizontal movements in selected directions resulting in signals proportional to the phase differences, producing an indicia of elevational movement comprising a signal whose magnitude is proportional to the average level of the frequency difference signal.

2. A Doppler navigation system for generating indicia of movement relative to a surface at a position above the surface, said navigation system comprising:

a first laser for generating a first laser beam, a laser beam scanning system for conically scanning the first laser beam on the surface and for producing a return laser beam by synchronously receiving, during the scan, the laser beam scattered from the surface, means for generating a second laser beam at a frequency which is different than the frequency of said first laser beam and a reference frequency;

detector means for heterodyning said return beam and said second laser beam to produce a first electrical signal indicative of the difference between a frequency change of said return beam and said reference frequency, a discriminator detector for providing a second electrical signal indicative of the frequency change of said return laser beam, said scanning system including means for synchronously generating a scan position signal that is indicative of the position of the scan relative to a reference position, vector resolving means comprising:

means for splitting said scan position signal into two quadrature components, means for generating a first indicia of movement in one horizontal direction from the phase difference between one of said quadrature components and said second electrical signal, means for generating a second indicia of movement in another horizontal direction from the phase difference between said second electrical signal and the second of said quadrature components, and means for generating an indicia of elevational movement from the average level of the second electrical signal.

3. A Doppler navigation system according to claim 2, characterized in that:

said scan position generating means comprises an oscillator for producing a repetitive signal at the scan frequency and means for phase shifting a portion of said repetitive signal 90° to produce one of said components.

* * * * *